US012004503B2

(12) United States Patent
Leeb (10) Patent No.: US 12,004,503 B2
(45) Date of Patent: Jun. 11, 2024

(54) COMPENSATION SYSTEM FOR AN AGRICULTURAL MACHINE, AND DISTRIBUTION MACHINE AND METHOD FOR COMPENSATING FOR GROUND UNEVENNESS FOR AN AGRICULTURAL MACHINE

(71) Applicant: HORSCH LEEB Application Systems GmbH, Landau an der Isar (DE)

(72) Inventor: Theodor Leeb, Landau an der Isar (DE)

(73) Assignee: HORSCH LEEB Application Systems GmbH, Landau an der Isar (DE)

( * ) Notice: Subject to any disclaimer, the term of this patent is extended or adjusted under 35 U.S.C. 154(b) by 696 days.

(21) Appl. No.: 17/199,276

(22) Filed: Mar. 11, 2021

(65) Prior Publication Data

US 2021/0282385 A1 Sep. 16, 2021

(30) Foreign Application Priority Data

Mar. 12, 2020 (DE) .......................... 102020106738.0

(51) Int. Cl.
*A01M 7/00* (2006.01)
*B62D 37/04* (2006.01)
(Continued)

(52) U.S. Cl.
CPC ........... *A01M 7/0089* (2013.01); *B62D 37/04* (2013.01); *B62D 49/085* (2013.01); *A01B 63/10* (2013.01);
(Continued)

(58) Field of Classification Search
CPC .............. A01M 7/0089; A01M 7/0057; A01M 7/0075; B62D 37/04; B62D 49/085; A01B 63/10; A01B 73/065
See application file for complete search history.

(56) References Cited

U.S. PATENT DOCUMENTS 4,709,857 A * 12/1987 Wilger ................ A01M 7/0075
239/164
5,348,226 A * 9/1994 Heiniger ............. A01M 7/0057
239/164
(Continued)

FOREIGN PATENT DOCUMENTS

DE 102017201918 A1 8/2018
DE 102017119859 A1 * 2/2019 .......... A01M 7/0057
(Continued)

*Primary Examiner* — Arpad Fabian-Kovacs
(74) *Attorney, Agent, or Firm* — AVEK IP, LLC; Kent R. Erickson (57) ABSTRACT

A compensation system for an agricultural machine comprises a distributor boom mounted on a chassis in a height-adjustable manner. The distributor boom has side parts which are pivotably arranged to the left and right on a central part, and a plurality of distribution elements arranged thereon which are connected to a storage container for material to be distributed. A vertical position of the distributor may be changed by an actuating device. A data processor is configured to generate actuating signals for the actuating device for changing the vertical position. To prevent collisions of the distributor boom with the ground while at the same time minimizing drift, a sensor device is configured to detect rotation of the chassis or the distributor boom in the direction of travel and the data processor is configured to generate actuating signals for the actuating device based upon the rotation.

20 Claims, 4 Drawing Sheets

(51) Int. Cl.
 *B62D 49/08* (2006.01)
 *A01B 63/10* (2006.01)
 *A01B 73/06* (2006.01)
(52) U.S. Cl.
 CPC .......... *A01B 73/065* (2013.01); *A01M 7/0057* (2013.01); *A01M 7/0075* (2013.01)

(56) References Cited

U.S. PATENT DOCUMENTS

| | | | | |
|---|---|---|---|---|
| 5,988,528 | A * | 11/1999 | Krohn | A01M 7/0075 239/168 |
| 10,660,257 | B2 * | 5/2020 | Czapka | A01B 73/065 |
| 10,820,511 | B2 * | 11/2020 | Brimeyer | A01B 63/10 |
| 10,973,171 | B2 * | 4/2021 | Smith | G01S 13/87 |
| 11,110,470 | B2 * | 9/2021 | Smith | B05B 12/124 |
| 11,723,354 | B2 * | 8/2023 | Long | A01M 7/006 700/283 |
| 11,832,543 | B2 * | 12/2023 | Anderson | A01B 63/108 |
| 2011/0282554 | A1 * | 11/2011 | Keye | A01M 7/0057 701/49 |
| 2016/0249526 | A1 * | 9/2016 | Leeb | A01G 25/09 701/50 |
| 2016/0255769 | A1 * | 9/2016 | Leeb | A01C 23/047 |
| 2016/0316617 | A1 * | 11/2016 | Leeb | A01C 15/00 |
| 2018/0220638 | A1 | 8/2018 | Gresch et al. | |

FOREIGN PATENT DOCUMENTS

| | | | | |
|---|---|---|---|---|
| DE | 102018201121 | A1 * | 7/2019 | ........ A01M 7/0057 |
| EP | 3165090 | A1 * | 5/2017 | ........ A01M 7/0057 |
| EP | 3718400 | A1 * | 10/2020 | ........ A01G 25/092 |

* cited by examiner

COMPENSATION SYSTEM FOR AN AGRICULTURAL MACHINE, AND DISTRIBUTION MACHINE AND METHOD FOR COMPENSATING FOR GROUND UNEVENNESS FOR AN AGRICULTURAL MACHINE

CROSS-REFERENCE TO RELATED APPLICATIONS

This application claims the benefit of German Patent Application No. DE 10 2020 106 738.0, filed Mar. 12, 2020, the disclosure of which is hereby incorporated herein in its entirety by reference.

BACKGROUND

The invention relates to a compensation system for an agricultural machine, preferably a field sprayer and/or a fertilizer spreader. The invention further relates to a distribution machine as well as a method for compensating for ground unevenness for an agricultural machine, preferably a field sprayer and/or a fertilizer spreader.

SUMMARY

It is known from the prior art that agricultural machines, preferably field sprayers and/or fertilizer spreaders, are used for the uniform distribution of liquid and/or solid agricultural materials to be distributed. In order to achieve coverage which is as great as possible, such field sprayers and/or fertilizer spreaders have a distributor boom and/or spray boom extending over a large width transversely to a direction of travel of the agricultural machine. Wherein in each case distribution elements, such as for example spray nozzles, deflection elements or the like, are attached to the distributor boom for distributing the materials to be distributed.

Moreover, the distributor booms are mounted on a chassis of the agricultural machine so as to be adjustable in terms of the vertical position thereof relative to a plant population by means of an actuating device, in order to achieve thereby in each case an optimal vertical position of the distributor boom as a function of a plant population or as a function of a material to be distributed. Moreover, in order to detect the vertical position, distance sensors such as for example ultrasound sensors oriented in the direction of the plant population, i.e. oriented vertically downwardly, are attached to the distributor boom.

The distributor booms are also generally attached at a rear end, in some cases also at a front end, of the chassis, whereby as a function of changing inclinations of the chassis the vertical position of the distributor boom also changes therewith. However, this frequently leads to problems, in particular in the case of very uneven terrain and high travel speeds of the agricultural machine, since due to the mass inertia of the distributor boom and the inertia of the actuating device, it is occasionally not possible to react sufficiently rapidly to corresponding ground unevenness. Moreover, corresponding ground unevenness is directly identified on the distributor boom by the arrangement of ultrasound sensors, generally only when movements of the chassis have already led to a change in the vertical position of the distributor boom, so that hitherto a control and/or regulation of the vertical position always took place in a delayed manner, i.e. in particular not proactively, and thus a desired compensation of ground unevenness could not be achieved.

In particular in the case of ground unevenness, such as for example trenches in the field surface to be cultivated, this occasionally lead to significant problems, since when travelling into the trench the distributor boom was initially guided too high above the ground surface and thus on the basis of the ultrasound sensors was correspondingly adjusted downwardly, which could lead in turn to a collision of the distributor boom with the ground surface when travelling out of the trench. In order to counteract this, the actual distance was generally increased, i.e. even increased on flat field surfaces, which was associated with a series of drawbacks, however, when distributing the materials to be distributed, for example regarding drift.

In order to counteract the problems at least partially, hitherto a plurality of different sensors were respectively attached to the agricultural machine, in particular to the chassis and to the distributor boom, in order to improve the measuring result thereby. However, this system was occasionally sluggish due to the large quantities of data, so that a desired result was not achieved or only to a limited extent. Moreover, the use of a plurality of sensors is both expensive and prone to error.

Thus, it is the object of the invention to provide an agricultural machine by which the drawbacks of conventional techniques may be avoided. It is the object of the invention, in particular, to provide an agricultural machine with a distributor boom, by which even in the case of ground unevenness and high travel speeds collisions of the distributor boom may be prevented, with at the same time as little drift as possible.

The invention relates to a compensation system for an agricultural machine, preferably a field sprayer and/or fertilizer spreader.

The agricultural machine comprises a chassis bearing components of the agricultural machine and a distributor boom which is mounted on the chassis in a height-adjustable manner relative to the chassis and which has a central part and side parts which are pivotably arranged to the left and right on the central part by means of pivot axes, as well as a plurality of distribution elements which are arranged thereon and which are connected and/or connectable to a storage container for at least one material to be distributed, wherein a vertical position of the distributor boom relative to the chassis may be changed by means of an actuating device.

The agricultural machine additionally comprises a data processing device which is configured to generate actuating signals for the actuating device for changing the vertical position.

The agricultural machine further comprises a sensor device.

In order to provide an agricultural machine with a distributor boom, by which even in the case of ground unevenness and high travel speeds collisions of the distributor boom may be prevented, with at the same time as little drift as possible, it is provided that the sensor device is configured to detect a rotation of the chassis and/or the distributor boom in the direction of travel and that the data processing device is configured to generate actuating signals for the actuating device, using the rotation.

As a result of the measures taken according to the invention, accordingly a compensation system for an agricultural machine, preferably for a field sprayer and/or a fertilizer spreader, is provided, by detecting a rotation of the chassis and/or distributor boom any ground unevenness being able to be detected thereby and actuating signals being able to be generated thereby for the actuating device for changing the vertical position, such that damage to the distributor boom is avoided and the drift is not substantially worsened.

The detection system according to the invention is distinguished from the prior art, in particular, in that one sensor device is sufficient to avoid damage to the distributor boom in the case of ground unevenness.

It should be mentioned that the direction of travel, in particular, corresponds to a longitudinal direction of extent of the agricultural machine and/or a forward direction of the agricultural machine. It should also be mentioned that in the context of the invention, a rotation in the direction of travel encompasses, in particular, a rotation of the chassis and/or the distributor boom about a rotational axis oriented transversely to the direction of travel. Wherein the rotational axis may be formed, for example, by a running gear.

It should also be mentioned that the rotation in the direction of travel may also encompass a proportion of a rotation of the chassis transversely to the direction of travel, since generally corresponding ground unevenness is not oriented and/or travelled over exactly perpendicular to the direction of travel. Thus, in the context of the invention the definition of a rotation in the direction of travel also encompasses a rotation transversely to the direction of travel, which rotation transversely to the direction of travel, however, in particular causes in turn a rotation of the chassis and/or the distributor boom in the direction of travel.

It should be mentioned that, in the context of the invention, a detection of a rotation of the chassis and/or the distributor boom in the direction of travel may also encompass and/or contain a detection of an inclination, a rotation and/or an angular rate and/or the like of the chassis and/or the distributor boom in the direction of travel. Preferably pitching movements may be detected with the rotation. According to the invention, therefore, an inclination, an angular rate and/or the like may also be encompassed by a rotation.

In the context of the invention, in each case, the inclinations may be detected, in particular, relative to a reference plane.

It is expediently possible, preferably, that the sensor device is configured to detect a rotation of the chassis and/or the distributor boom in the direction of travel relative to a reference plane, wherein the reference plane may be defined, preferably, by a ground surface and/or an artificial horizon and/or a horizontal line (H) and/or an orientation of the gravitational acceleration (EB).

The reference plane has an orientation, for example, which corresponds to a horizontal line (for example mathematical horizontal line) and/or an artificial horizon (for example artificial horizontal plane, mathematical horizon or the like). The artificial horizontal plane is oriented, preferably, at right angles to the vertical direction of the chassis.

According to an alternative or additional embodiment, the reference plane has an orientation, for example, which corresponds to an orientation of the gravitational acceleration.

Alternatively or additionally, the reference plane may also have an orientation which is at least substantially parallel to a horizontal line or at least substantially parallel to an orientation of the gravitational acceleration.

It is possible that the sensor device and/or the data processing device is (are) configured to detect a direction of rotation (for example a rotational direction, direction of circulation, circumferential direction and/or the like) of the rotation in the direction of travel.

According to an embodiment, the compensation system may provide that the data processing device is configured, with a right-oriented direction of rotation (for example caused by travelling into a trench), to generate an actuating signal for the actuating device, such that no change is carried out to the vertical position of the distributor boom relative to the chassis. A right-oriented direction of rotation, for example, may correspond to a positive angular rate (for example, angular rate+).

According to an embodiment, the compensation system may provide that the data processing device is configured, with a right-oriented direction of rotation (for example caused by travelling into a trench), to generate an actuating signal for the actuating device, such that by means of the actuating device a change is carried out to the vertical position of the distributor boom relative to the chassis, preferably, such that an increase in the vertical position and/or a reduction in the vertical position of the distributor boom relative to the chassis is carried out, preferably, without the use of additional data from distance sensors on the distributor boom.

Alternatively or additionally, it may be provided that the data processing device is configured, with a left-oriented direction of rotation (for example caused by travelling uphill and/or travelling out of a trench), to generate an actuating signal for the actuating device, such that by means of the actuating device a change is carried out to the vertical position of the distributor boom relative to the chassis, preferably, such that an increase in the vertical position of the distributor boom relative to the chassis is carried out. A left-oriented direction of rotation, for example, may correspond to a negative angular rate (for example, angular rate −).

It may be provided that the sensor device is configured to detect a rotation, an inclination and/or an angular rate of the chassis and/or the distributor boom in the direction of travel. It may also be provided that the sensor device for detecting a rotation is configured to detect an acceleration.

The sensor device may comprise and/or have at least one sensor detecting inclinations (for example an inclination sensor) and/or a sensor detecting accelerations (for example an acceleration sensor) and/or a sensor detecting an angular rate (for example an angular rate sensor, gyroscope or the like). Preferably, the sensor device for detecting a rotation of the chassis and/or the distributor boom may be formed by at least one inclination sensor and/or acceleration sensor and/or angular rate sensor.

According to an embodiment, it may be provided that the sensor device is formed by at least one angular rate sensor (for example a gyroscope), which angular rate sensor is configured to detect an angular rate of the chassis and/or the distributor boom in the direction of travel and that the data processing device and/or the sensor device is configured to calculate by temporal integration of the angular rate an inclination of the chassis and/or the distributor boom in the direction of travel. Wherein in this case it should be mentioned that an inclination also causes a rotation, so that in turn a rotation of the chassis and/or the distributor boom in the direction of travel may be detected using the inclination.

In order to obtain, as far as possible, an accurate adaptation of the vertical position of the distributor boom relative to the chassis it may be provided that the data processing device is configured to generate actuating signals for the actuating device using the vehicle geometry of the agricultural machine and the inclination of the chassis and/or the distributor boom caused by the rotation of the chassis and/or the distributor boom in the direction of travel.

It is expediently possible that the data processing device is configured to calculate a vertical position of the distributor boom relative to the chassis and/or relative to the ground surface (for example target surface, plant population or the like) using at least one of the following:
- using a vehicle geometry of the agricultural machine and/or
- using a detected rotation and/or
- using a detected inclination and/or
- using a travel speed of the agricultural machine.

It is possible that the data processing device is configured to calculate actuating signals, in particular control and/or regulating signals, for the actuating device using at least one of the following:
- using a vehicle geometry of the agricultural machine and/or
- using a detected rotation and/or
- using a detected inclination and/or
- using a travel speed of the agricultural machine.

The vehicle geometry may be defined, for example, by the dimensions of the chassis and/or the running gear and/or the distance of the distributor boom from the chassis and/or the position of the sensor device.

A preferred embodiment may additionally provide that the data processing device is configured to generate actuating signals as a function of a rotation of the chassis and/or the distributor boom in the direction of travel, such that a vertical position of the distributor boom relative to the chassis is changed such that an actual distance of the distributor boom relative to a ground surface is kept at least substantially constant and/or is kept within defined and/or definable limit values.

It should be mentioned that in the context of the invention the ground surface may also be defined by a plant population and/or a target surface.

Moreover, the agricultural machine has at least one sensor arrangement for determining a target distance (for example the vertical position) of the distributor boom relative to a target surface (for example a plant population and/or a ground surface).

According to a further aspect of the invention it is possible that the agricultural machine, respectively the compensation system, has a sensor arrangement.

The sensor arrangement may be formed by one or more distance sensors (for example ultrasound sensors, laser sensors and/or the like) measuring a distance between the distributor boom and the target surface (for example a plant population and/or a ground surface). Preferably, the sensor arrangement is configured to detect an actual distance between the distributor boom, expediently the distribution elements of the distributor boom, relative to the ground surface (for example a plant population, target surface or the like).

Insofar as the sensor arrangement comprises two or more distance sensors, it may also be provided that an average value is formed from the output signals of the two or more distance sensors, which average value in turn is able to be correspondingly processed by the data processing device to form actuating signals for the actuating device.

It is possible that the data processing device is configured in a first operating mode and in a second operating mode to generate actuating signals for the actuating device, wherein in the first operating mode actuating signals are generated for the actuating device on the basis of actual distances of the distributor boom relative to a ground surface detected by means of distance sensors arranged on the distributor boom, and wherein in the second operating mode actuating signals are generated for the actuating device on the basis of a rotation of the chassis and/or the distributor boom in the direction of travel detected by means of the sensor device.

In order to improve even further the compensation of ground unevenness, it may also be provided that the data processing device is configured in a third operating mode to generate actuating signals for the actuating device, wherein in the third operating mode actuating signals are generated for the actuating device on the basis of actual distances of the distributor boom relative to a ground surface detected by means of distance sensors arranged on the distributor boom, and on the basis of a rotation of the chassis and/or the distributor boom in the direction of travel detected by means of the sensor device. Wherein in this case it may also be provided that the output signals of the distance sensors and the sensor device are converted by means of a control and/or regulating program stored in the data processing device to form actuating signals for the actuating device, in particular, it may be provided that the output signals are combined by means of sensor data fusion.

It is possible that the data processing device is configured in a first operating mode, a second operating mode and/or a third operating mode to generate actuating signals for the actuating device, wherein a change of operating mode is initiated on the basis of a threshold value, wherein the threshold value is preferably defined by
- a maximum and/or minimum rotation (for example maximum 1° or 3° or 5° or more and/or minimum 1° or 3° or 5° or more) of the chassis and/or the distributor boom in the direction of travel and/or
- a minimum time (for example 1 second or 3 seconds or 5 seconds or 10 seconds or more) in which a rotation of the chassis and/or the distributor boom in the direction of travel is present, and/or
- a distance travelled (for example 0.5 metres or 1 metre or 3 metres or more) in which a rotation of the chassis and/or the distributor boom in the direction of travel is present.

According to a further feature of the invention, the agricultural machine is configured as an agricultural machine, preferably a field sprayer or fertilizer spreader, which is self-propelled (for example a self-propelled field sprayer, self-propelled fertilizer spreader, tractor or the like) and/or towed by means of the towing vehicle (for example a field sprayer, fertilizer spreader or the like towed by means of the tractor) and/or attached to a towing vehicle (for example by means of a three-point hitch). According to the invention, the agricultural machine may thus be designed as an individual machine but also as a machine combination and, for example, comprise a towing vehicle and a working machine towed by means of the towing vehicle. The agricultural machine may also be configured autonomously (for example fully autonomously and/or partially autonomously).

The agricultural machine is preferably configured as a field sprayer and/or as a fertilizer spreader. Preferably, the agricultural machine is configured and/or suitable for the distribution of liquid and/or solid materials to be distributed (for example a plant protection agent, fertilizer and/or the like).

The agricultural machine has at least one chassis bearing components of the agricultural machine. Wherein the chassis is formed, preferably, by the running gear and/or the frame of the agricultural machine and/or comprises a running gear. Preferably, the chassis forms a load-bearing part of the agricultural machine, the running gear and the wheel suspensions thereof being attached thereto as components, for example. However, storage containers, engine units, transmissions and/or the like may also be attached, for example. The chassis may be designed in one piece or in multiple pieces and may be made up of unreleasable and/or releasable connections.

For distributing the respective materials to be distributed the agricultural machine also has at least one distributor boom (for example a spray boom) arranged (for example mounted) in a height-adjustable manner relative to the chassis, with a central part and side parts which are pivotably arranged to the left and right on the central part by means of pivot axes, and with a plurality of distribution elements (for example spray nozzles or deflection elements and/or the like) which are arranged thereon and which are connected and/or connectable to a storage container for at least one material to be distributed. The distributor boom is expediently designed such that in a working position it extends transversely to the direction of travel over a large working width of, for example, 24 meters or 30 meters or more. It may also be provided that the side parts may be pivoted relative to the central part for transport travel.

According to an advantageous embodiment of the invention it may be provided that an actual distance (for example a target distance), i.e. a vertical position of the distributor boom, is defined and/or may be defined relative to a ground surface (for example 20 cm or 50 cm). Thus, a required vertical position of the distributor boom may be defined by means of the actual distance. In order to permit adaptations of the actual distance as a function of the inclination of the chassis, it may be provided that the actual distance may move within defined and/or definable limit values, i.e. preferably is kept within defined and/or definable limit values of the actual distance. Wherein the limit value may be at least 2 cm or 5 cm or at least 10 cm or at least 20 cm upwardly and/or downwardly.

Additionally, the agricultural machine has at least one (for example controlling and/or regulating) actuating device (for example an actuator) influencing a vertical position of the boom.

The actuating device may be formed, preferably, by one or more pneumatically and/or hydraulically and/or electrically actuatable and/or operated actuator(s) (for example fluid cylinder, motor, actuating drive and/or the like). Preferably, the actuating device may be formed by one or more single-acting and/or by one or more dual-acting cylinders (for example fluid cylinder).

It should be mentioned that according to the invention a detection may also encompass a production, a generation, a determination and/or the like.

It is possible that as a function of a rotation of the chassis and/or the distributor boom in the direction of travel, a travel speed of the agricultural machine is also controlled and/or regulated by means of the data processing device. In other words, if the agricultural machine moves, for example, at such a high travel speed that the actuating device is not able to react sufficiently rapidly, the travel speed may be correspondingly changed. Wherein the adaptation of the travel speed, for example, may be carried out in an automated manner by means of the data processing device.

It is possible that the agricultural machine, preferably the data processing device, has a graphical display device and/or is signal-connected and/or is signal-connectable to a graphical display device and the graphical display device is configured to display detected rotations (for example inclinations, angular rates or the like) in graphical terms. The graphical display device, for example, may be a terminal, a display, a mobile terminal device, a computer and/or the like.

The chassis and/or the running gear assigned to the chassis may have one or more wheel suspensions, wherein preferably two such wheel suspensions may form an axle and wherein at least one running wheel may be assigned to each wheel suspension.

According to the invention it may be expediently provided that the agricultural machine, preferably the running gear, has at least one axle, preferably a first axle and/or a second axle, wherein the first axle (for example front axle) and/or the second axle (for example rear axle) in each case may have two running wheels. The wheel suspensions, respectively the running wheels, of at least one axle may also be steerable relative to the chassis.

Alternatively or additionally, it also may be provided that the running wheels are arranged to the left and right of the chassis, wherein at least the running wheels of the first axle and/or the second axle may be vertically movable relative to the chassis. Wherein a vertical mobility may be expediently implemented such that the running wheels are height-adjustable and/or sprung relative to the chassis in order to achieve thereby, in particular, good driving quality and effective adaptation to the ground. A relative distance between the running wheel and the chassis may be correspondingly defined, i.e. expediently varied, as a function of the vertical mobility.

It is possible that at least two running wheels are arranged in a vertically movable manner relative to the chassis and the data processing device is configured to calculate a rotation by considering a relative distance of the running wheels relative to the chassis. In other words, for example, if the running wheels of one axle (for example the first axle) are at a shorter relative distance from the chassis than the running wheels of a further axle (for example the second axle) or for example at least one running wheel which is arranged to the left adjacent to the chassis is at a different relative distance from the chassis than a running wheel which is arranged to the right adjacent to the chassis, the rotation of the chassis also changes, preferably, relative to a reference plane.

According to an embodiment, in particular, it may be provided that the data processing device is configured to calculate a rotation by considering a relative distance of the running wheels of the first axle relative to the chassis and a relative distance of the running wheels of the second axle relative to the chassis and/or by considering a relative distance of the running wheels to the left relative to the chassis and a relative distance of the running wheels to the right relative to the chassis.

According to a further embodiment it is possible that the track width (for example the track spacing) of the running wheels of at least one axle is adjustable, preferably expediently by means of an actuating drive (for example hydraulically and/or pneumatically and/or electrically operated cylinders). Wherein the data processing device may be also be configured to calculate a rotation by considering the track width of the running wheels.

Measuring means (for example path measuring systems, distance sensors and/or the like) may be provided for detecting the relative distance between the running wheels and the chassis. For example, the running wheels, respectively the wheel suspensions, may be provided with actuators (for example hydraulically and/or pneumatically and/or electrically operated cylinders) for vertical mobility and, for example, the movements of the actuators are correspondingly measured by means of the measuring means. A pressure sensor system and/or force sensor system which is connected and/or coupled to the actuator may also be conceivable and/or usable.

The data processing device has, for example, a computer unit, an on-board computer and/or the like, and additionally comprises a control and/or regulating circuit, preferably a hydraulic and/or pneumatic and/or electrical control and/or regulating circuit, wherein the control and/or regulating circuit is expediently configured for the hydraulic and/or pneumatic and/or electrical transmission of signals and/or commands.

In the context of the invention the term "data processing device", preferably, encompasses all of the components for the transmission of signals and/or commands. Accordingly, also computer units, CPUs and/or the like. Correspondingly, data processing devices which are integrated in the respective sensors or sensor units or sensor arrangements are also encompassed thereby.

The data processing device may also be configured to combine the data of two or more sensor devices, sensors or the like in order to produce actuating signals therefrom for the actuating device.

It should also be mentioned that the terms "control" and "regulate" and/or "control device" and "regulating device" may refer to electronic and/or pneumatic and/or hydraulic controllers or regulators which may undertake control tasks and/or regulating tasks according to the design thereof. Even if the term "control" is used herein, equally "regulate" may also be expediently encompassed thereby. Similarly, with the use of the term "regulate" equally a "control" may also be encompassed thereby.

In order to avoid repetition, features disclosed in connection with the compensation system are also intended to be disclosed and to be claimable for an agricultural distribution machine and for the method. The aforementioned aspects and features according to the invention and embodiments, in particular regarding the compensation system, thus also apply to the distribution machine and to the method. The same applies in reverse, so that all of the aspects, features according to the invention and embodiments which are disclosed in connection with the distribution machine or the method, are also accordingly disclosed and are correspondingly claimable for the compensation system.

For solving the objects, the invention further comprises a distribution machine, preferably a field sprayer and/or fertilizer spreader. The distribution machine serves, preferably, for dispensing agricultural materials to be distributed such as seed, fertilizer and/or plant protection agent and comprises a compensation system as described herein, preferably, a compensation system according to one of claims 1 to 14.

The distribution machine, preferably the field sprayer and/or the fertilizer spreader, may be designed as a self-propelled distribution machine or as a distribution machine which is towed by means of a towing vehicle (for example tractor) or as a distribution machine which is attached to a towing vehicle (for example by means of a three-point hitch).

For solving the objects, the invention further comprises a method for compensating for ground unevenness for an agricultural machine, preferably a field sprayer and/or fertilizer spreader. The invention comprises a chassis bearing components of the agricultural machine and a distributor boom which is mounted on the chassis in a height-adjustable manner relative to the chassis and which has a central part and side parts which are pivotably arranged to the left and right on the central part by means of pivot axes, as well as a plurality of distribution elements which are arranged thereon and/or which are connected and/or connectable to a storage container for at least one material to be distributed, wherein a vertical position of the distributor boom relative to the chassis may be changed by means of an actuating device, and also comprises a data processing device which is configured to generate actuating signals for the actuating device for changing the vertical position, and a sensor device.

The method is characterized by a detection of a direction of rotation of a rotation of the chassis and/or the distributor boom in the direction of travel by means of a sensor device and a generation of actuating signals for the actuating device by means of the data processing device, using the direction of rotation.

According to a further embodiment of the method it may also be provided that the data processing device is configured in a first operating mode, a second operating mode and/or a third operating mode to generate actuating signals for the actuating device.

The method may provide that in the first operating mode actuating signals are generated for the actuating device on the basis of actual distances of the distributor boom relative to a ground surface detected by means of distance sensors arranged on the distributor boom.

The method may alternatively or additionally provide that in the second operating mode actuating signals are generated for the actuating device on the basis of a rotation of the chassis and/or the distributor boom in the direction of travel detected by means of the sensor device.

The method may also provide that in the third operating mode actuating signals are generated for the actuating device on the basis of actual distances of the distributor boom relative to a ground surface detected by means of distance sensors arranged on the distributor boom, and on the basis of a rotation of the chassis and/or the distributor boom in the direction of travel detected by means of the sensor device.

DESCRIPTION OF THE DRAWINGS

The preferred embodiments and features of the invention described above are able to be combined together in any manner. Further details and advantages of the invention are described hereinafter with reference to the accompanying drawings. The size ratios of the individual elements to one another in the figures do not always correspond to the actual size ratios, since some shapes are simplified and other shapes are shown enlarged in comparison with other elements, for greater clarity. In the drawings.

DETAILED DESCRIPTION

The embodiments shown in FIGS. 1 to 4 at least partially coincide so that parts which are similar or identical are provided with the same reference numerals, and for the description thereof reference is also made to the description of the other embodiments and/or figures in order to avoid repetition. The embodiments which are shown merely represent examples as to how the compensation system according to the invention, the distribution machine according to the invention and the method according to the invention may be embodied and designed, and do not constitute a final limitation thereof.

Figure 1:
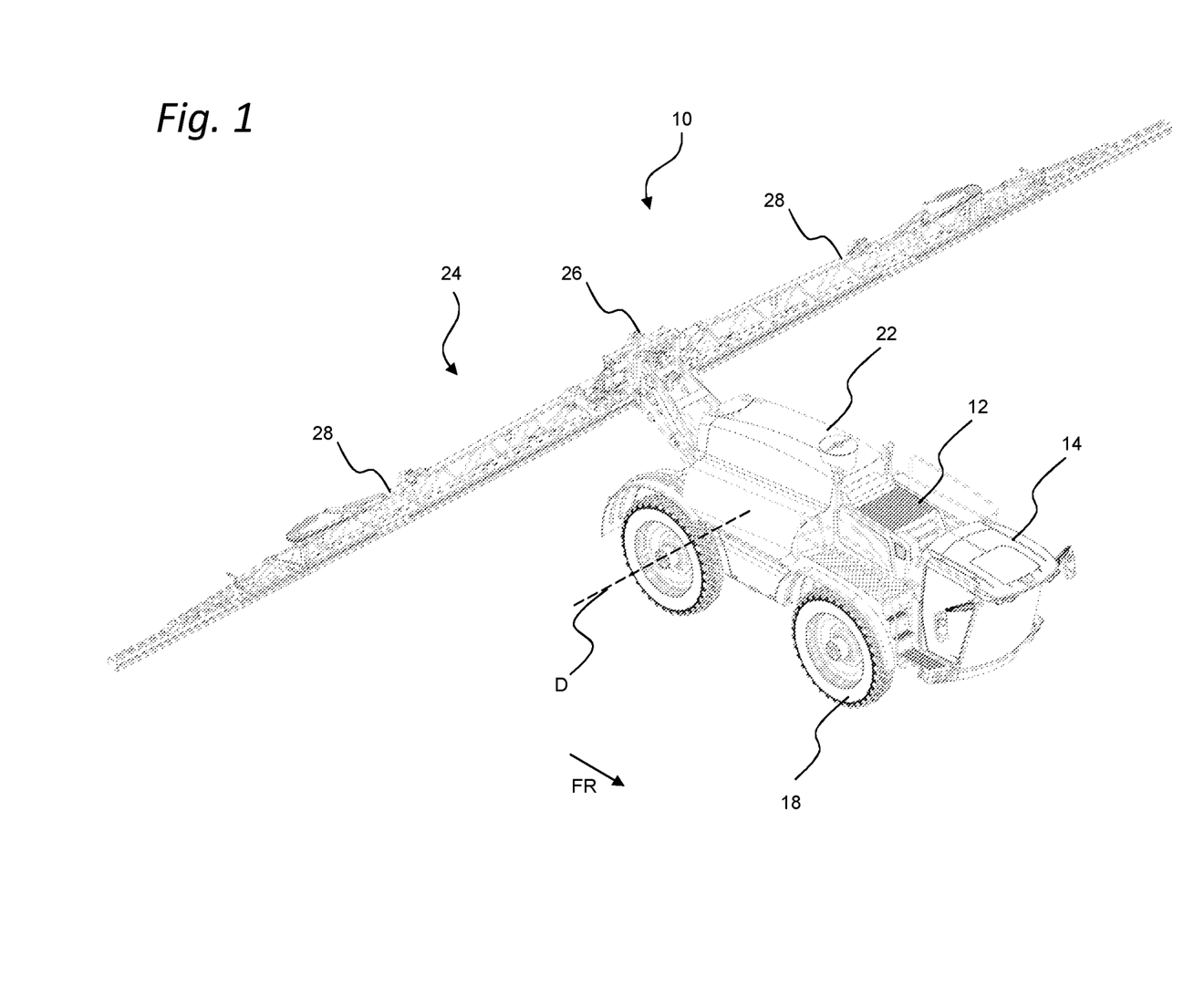
FIG. 1 shows a perspective view of an embodiment of an agricultural machine.
Figure 2:
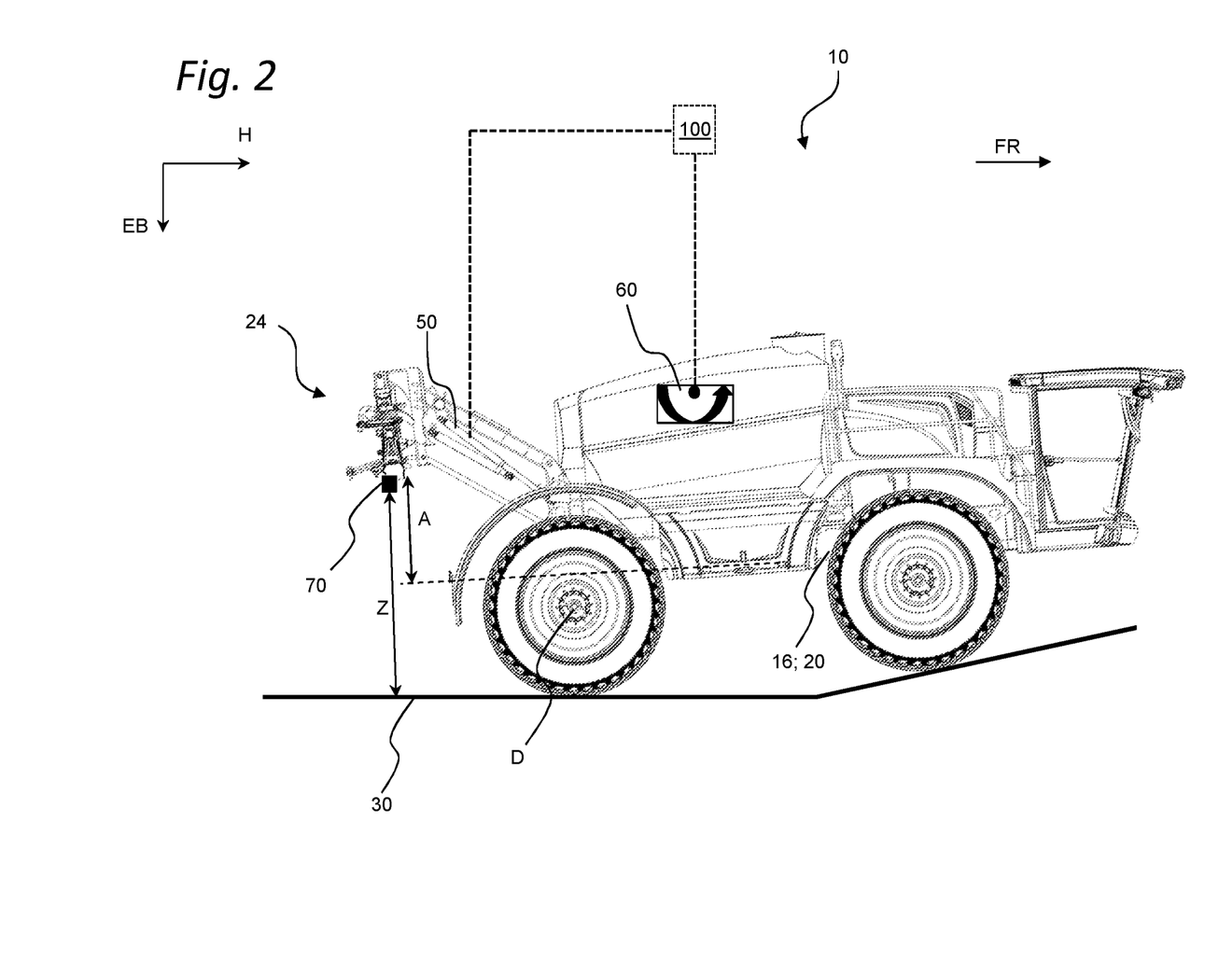
FIG. 2 shows a side view of an embodiment of an agricultural machine with a rotation of the chassis and the distributor boom in the direction of travel, having a left-orientated direction of rotation.
Figure 3:
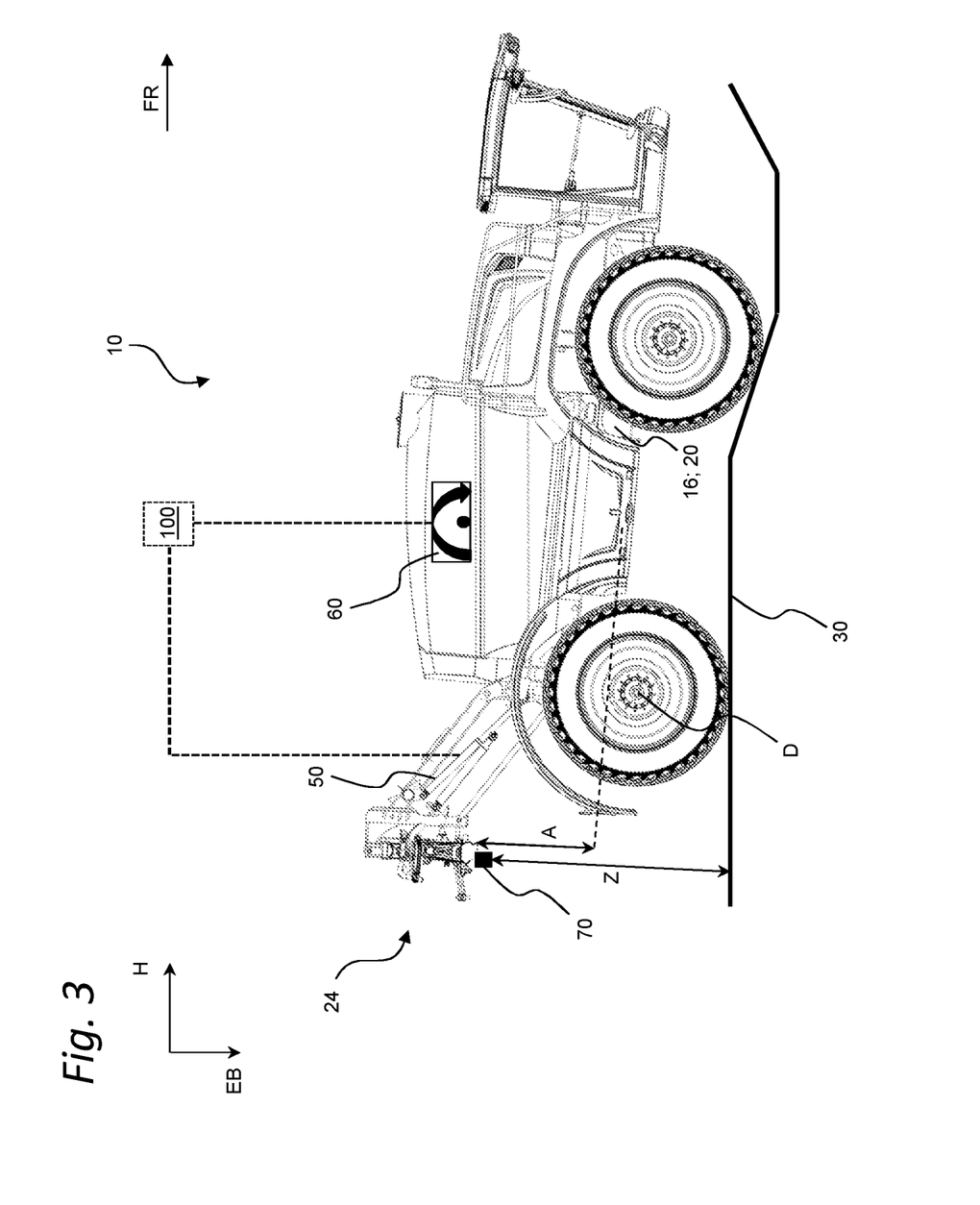
FIG. 3 shows a side view of an embodiment of an agricultural machine with a rotation of the chassis and the distributor boom in the direction of travel, having a right-oriented direction of rotation.

An embodiment of an agricultural machine 10 according to the invention, preferably a field sprayer and/or a fertilizer spreader, is disclosed in the perspective view of FIG. 1 and the side views of FIGS. 2 and 3. The agricultural machine 10 is designed as a distribution machine in the form of a field sprayer. The agricultural machine 10 is additionally designed as a self-propelled field sprayer, with an engine unit 12 and a driver's cab 14 for an operator.

The agricultural machine 10, respectively the distribution machine, comprises, preferably, a compensation system as described herein. Preferably, the distribution machine comprises a compensation system according to one of the claims. The agricultural machine 10, respectively the distribution machine, is configured for executing a method for compensating for ground unevenness as described herein, preferably a method according to the method claims.

According to the exemplary embodiments, the agricultural machine 10 comprises a chassis 16 bearing components of the agricultural machine 10, with a running gear 18 and a frame construction 20. The agricultural machine 10 additionally comprises a storage container 22 for carrying and providing agricultural material to be distributed. For distributing the material to be distributed, the agricultural machine 10 additionally comprises a distributor boom 24 which is mounted on the chassis 16 in a height-adjustable manner relative to the chassis 16.

The distributor boom 24 is shown in a working position and extends over a large working width (for example 24 metres, 30 metres or more) transversely to the direction of travel FR. The distributor boom 24 is made up of a central part 26 and side parts 28 which are pivotably arranged to the left and right on the central part by means of pivot axes. Moreover, a plurality of distribution elements which are connected and/or connectable to the storage container 22 are attached to the distributor boom 24 for distributing agricultural material to be distributed.

For changing a vertical position A of the distributor boom 24 relative to the chassis 16, respectively relative to a ground surface 30 (for example a target surface, plant population and/or the like), the agricultural machine 10 comprises an actuating device 50, which actuating device 50, for example, may be formed by one or more actuator(s) (for example hydraulic cylinders and/or pneumatic cylinders) which may be signal-connected and/or signal-connectable in a wired and/or wireless manner to a data processing device 100 (see FIGS. 2 and 3 in dashed lines).

As is disclosed in FIGS. 2 and 3, a vertical position A, for example, may refer to a relative distance of the distributor boom 24 from the chassis 16, and/or to a reference point/ reference axis of the chassis 16.

The data processing device 100 is designed and/or configured, preferably, to generate (for example to calculate) actuating signals for the actuating device 50.

The compensation system and/or the chassis 16 also comprises a sensor device 60, wherein the sensor device 60 is configured to detect a rotation (for example in the form of an angular rate and/or inclination and/or the like) of the chassis 16 and/or the distributor boom 24 in the direction of travel FR.

It should also be mentioned that the rotation in the direction of travel FR may also encompass a proportion of a rotation of the chassis 16 transversely to the direction of travel FR, since generally corresponding ground unevenness is not oriented and/or travelled over exactly perpendicular to the direction of travel FR. Thus in the context of the invention, the definition of a rotation in the direction of travel FR also encompasses a rotation transversely to the direction of travel FR, which rotation transversely to the direction of travel FR, however, preferably causes a rotation of the chassis 16 and/or the distributor boom 24 in turn in the direction of travel FR.

According to the invention, it is provided that the data processing device 100 is configured to generate actuating signals for the actuating device 50, using the rotation.

It may be provided that the sensor device 60 is configured to detect a rotation of the chassis 16 and/or the distributor boom 24 in the direction of travel FR in relation to, i.e. relative to, a reference plane, wherein the reference plane may be defined, for example, by a ground surface 30 and/or an artificial horizon and/or a horizontal line H and/or an orientation of the gravitational acceleration EB.

As is disclosed in FIGS. 1 to 3, the direction of travel FR corresponds to a direction of longitudinal extent of the agricultural machine 10 and/or a forward direction of the agricultural machine 10. Additionally, a rotation in the direction of travel FR is defined, in particular, by a rotation of the chassis 16 and/or the distributor boom 24 about a rotational axis D oriented transversely to the direction of travel FR. Wherein the rotational axis D according to the exemplary embodiment is formed by an axis of the chassis 18. A different axis/rotational axis might also be conceivable.

As is disclosed in FIG. 2, the rotation of the chassis 16 and/or the distributor boom 24 shown has a left-oriented direction of rotation (for example angular rate −) which, for example, may be caused by uphill travel. In order to avoid damage to the distributor boom 24, by the changing actual distance Z, it may also be provided, upon a left-oriented direction of rotation, that the data processing device 100 is configured to generate an actuating signal for the actuating device 50 such that by means of the actuating device 50 a change to the vertical position A (and thus to the actual distance Z) of the distributor boom 24 relative to the chassis 16 is carried out, preferably such that the vertical position A of the distributor boom 24 is increased relative to the chassis 16.

As is disclosed in FIG. 3, the rotation of the chassis 16 and/or the distributor boom 24 shown has a right-oriented direction of rotation (for example rotation rate+) which may be caused, for example, by driving into a trench. Since the actual distance of the distributor boom 24 relative to the ground surface 30 is increased thereby, a change to the vertical position A relative to the chassis 16 is not absolutely necessary but it may accordingly be provided thereby that, with a right-oriented direction of rotation, the data processing device 100 is configured to generate an actuating signal for the actuating device 50 such that no change is carried out to the vertical position A of the distributor boom 24 relative to the chassis 16.

The sensor device 60 may be formed by at least one inclination sensor and/or acceleration sensor and/or an angular rate sensor, to detect a rotation of the chassis 16 and/or the distributor boom 24.

For determining an actual distance Z and/or target distance Z of the distributor boom 24 relative to the ground surface 30, the agricultural machine 10 comprises a sensor arrangement comprising at least one distance sensor 70 and/or said sensor arrangement is assigned, preferably, to the distributor boom 24.

The sensor arrangement may be formed by one or more distance sensors 70 (for example an ultrasound sensor, laser sensor and/or the like) measuring an actual distance Z between the distributor boom 27 and the ground surface 30 (for example a plant population and/or target surface). In particular, the sensor arrangement is configured to detect an actual distance Z between the distributor boom 24, expediently the distribution elements of the distributor boom 24 relative to the ground surface 30.

Figure 4:
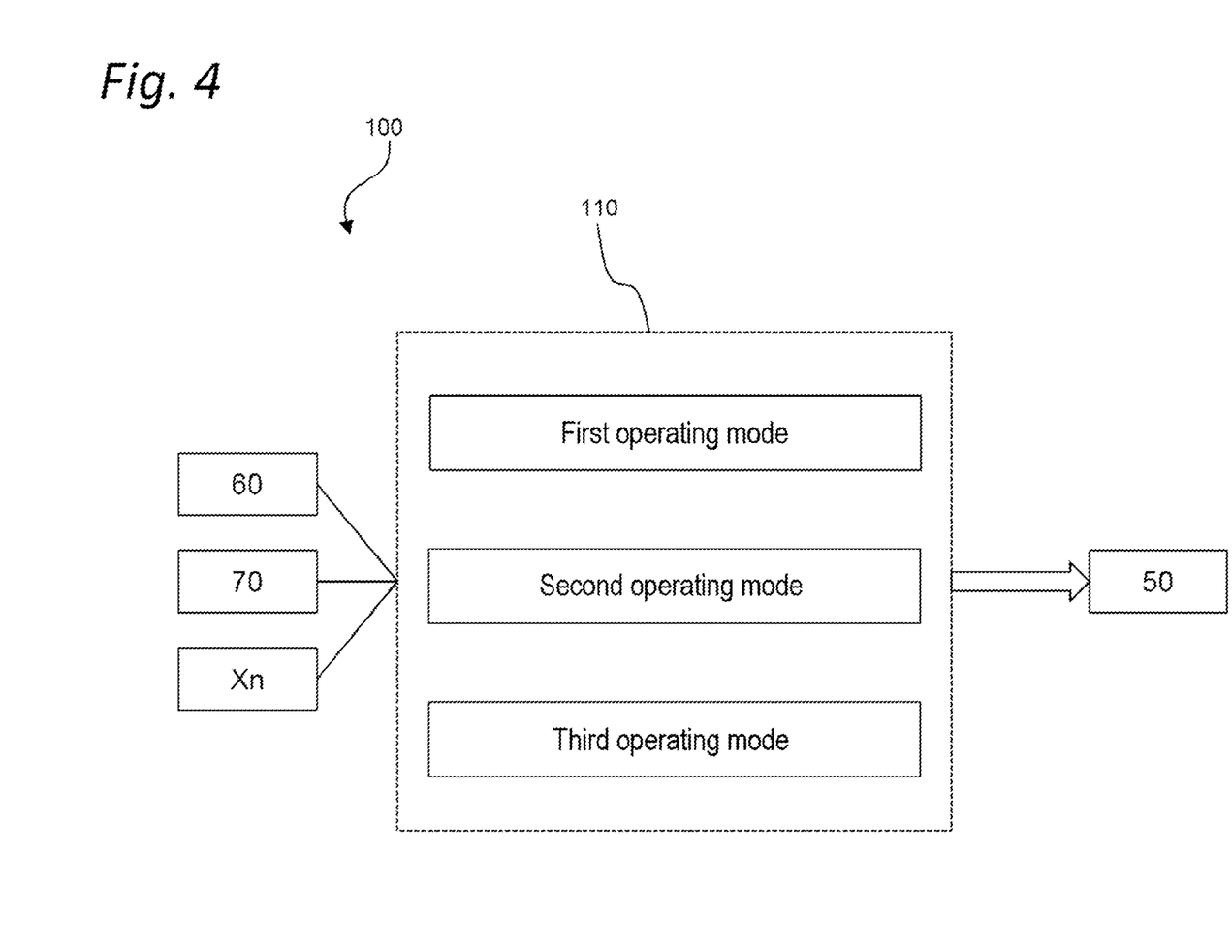
FIG. 4 shows a block diagram of a data processing device which is configured to generate actuating signals for the actuating device, using different operating modes.

Further details of the invention are disclosed in the block diagram of FIG. 4. The data processing device 100 comprises a computer unit 110 in which, in particular, a control and/or regulating program may be stored, and which control and/or regulating program may be configured in turn to generate actuating signals for the actuating device 50.

According to FIG. 4 it is possible that the data processing device 100 is configured in a first operating mode and in a second operating mode to generate actuating signals for the actuating device 50, wherein in the first operating mode actuating signals are generated for the actuating device 50 on the basis of actual distances Z of the distributor boom 24 relative to a ground surface 30 detected by means of distance sensors 70 arranged on the distributor boom 24, and wherein in the second operating mode actuating signals are generated for the actuating device 50 on the basis of a rotation of the chassis 16 and/or the distributor boom 24 in the direction of travel FR detected by means of the sensor device 60.

In order to improve the compensation of ground unevenness further, it may also be provided that the data processing device 100 is configured in a third operating mode to generate actuating signals for the actuating device 50, wherein in the third operating mode actuating signals are generated for the actuating device 50 on the basis of actual distances Z of the distributor boom 24 relative to a ground surface 30 detected by means of distance sensors 70 arranged on the distributor boom 24, and on the basis of a rotation of the chassis 16 and/or the distributor boom 24 in the direction of travel FR detected by means of the sensor device 60.

As is also disclosed in FIG. 4, the data processing device 100 may also be configured to generate actuating signals for the actuating device 50, using further sensor data Xn.

While the invention has been described with reference to specific exemplary embodiments, it is obvious to a person skilled in the art that various changes may be carried out and equivalents used as replacements without departing from the scope of the invention. In addition, many modifications may be carried out without departing form the associated scope of the invention. As a result, the invention is not intended to be limited to the disclosed exemplary embodiments but is intended to encompass all of the exemplary embodiments which fall within the scope of the accompanying claims. In particular, the invention also claims protection for the subject matter and the features of the subclaims independently of the claims made by way of reference.

LIST OF REFERENCE NUMERALS

10 Agricultural machine, distribution machine
12 Engine unit
14 Driver's cab
16 Chassis
18 Running gear
20 Frame construction
22 Storage container
24 Distributor boom
26 Central part
28 Side part
30 Ground surface
Xn Sensor data
50 Actuating device
60 Sensor device
70 Distance sensor
100 Data processing device
110 Computer unit
FR Direction of travel
H Horizontal line
EB Gravitational acceleration
A Vertical position
Z Target distance; actual distance
D Rotational axis

The invention claimed is:

1. A compensation system for an agricultural machine, comprising:
a chassis bearing components of the agricultural machine;
a distributor boom which is mounted on the chassis in a height-adjustable manner relative to the chassis, comprising:
  a central part and side parts which are pivotably arranged to the left and right on the central part; and
  a plurality of distribution elements arranged thereon, which are connected or connectable to a storage container for at least one material to be distributed;
an actuating device for changing a vertical position of the distributor boom relative to the chassis;
a sensor device configured to detect a rotation in the direction of travel, wherein the rotation comprises at least one of:
  a rotation of the chassis in the direction of travel; or
  a rotation of the distributor boom in the direction of travel; and
a data processing device configured to generate actuating signals for the actuating device for changing the vertical position, wherein the actuating signals are generated based on the rotation.

2. The compensation system according to claim 1, wherein the sensor device is configured to detect the rotation relative to a reference plane; and
wherein the reference plane is defined by at least one of:
  a ground surface;
  an artificial horizon;
  a horizontal line; or
  an orientation of the gravitational acceleration.

3. The compensation system according to claim 1, wherein the sensor device and/or the data processing device determines a direction of the rotation in the direction of travel.

4. The compensation system according to claim 1, wherein, upon a right oriented direction of rotation, the data processing device is configured to generate an actuating signal for the actuating device, such that no change is carried out to the vertical position of the distributor boom relative to the chassis.

5. The compensation system according to claim 1, wherein, upon a right oriented direction of rotation, the data processing device is configured to generate an actuating signal for the actuating device, such that one or more increases or reductions in the vertical position of the distributor boom, relative to the chassis, is carried out.

6. The compensation system according to claim 1, wherein, upon a left-oriented direction of rotation, the data processing device is configured to generate an actuating signal for the actuating device, such that an increase in the vertical position of the distributor boom, relative to the chassis, is carried out by the actuating device.

7. The compensation system according to claim 1, wherein the sensor device is configured to detect at least one of:
- a rotation;
- an inclination;
- an angular rate of the chassis in the direction of travel; or
- an angular rate of the distributor boom in the direction of travel.

8. The compensation system according to claim 1, wherein the sensor device comprises at least one of:
- an inclination sensor;
- an acceleration sensor; or
- an angular rate sensor.

9. The compensation system according to claim 1, wherein:
- the sensor device is formed by at least one angular rate sensor configured to detect an angular rate of at least one of the chassis or the distributor boom, in the direction of travel; and
- at least one of the data processing device or the sensor device, is configured to calculate by time integration of the angular rate, an inclination of at least one of the chassis or the distributor boom in the direction of travel.

10. The compensation system according to claim 1, wherein the data processing device is configured to generate actuating signals for the actuating device using the vehicle geometry of the agricultural machine, and using at least one of the inclination of the chassis or the distributor boom, caused by the rotation of the chassis or the distributor boom in the direction of travel.

11. The compensation system according to claim 1, wherein the data processing device is configured to generate actuating signals as a function of a rotation in the direction of travel of at least one of the chassis or the distributor boom, such that a vertical position of the distributor boom relative to the chassis is changed, such that an actual distance of the distributor boom relative to a ground surface is kept substantially constant or within defined limit values.

12. Compensation system according to claim 1, wherein:
- the data processing device is configured, in a first operating mode and in a second operating mode, to generate actuating signals for the actuating device;
- wherein in the first operating mode, actuating signals are generated for the actuating device on the basis of actual distances of the distributor boom relative to a ground surface detected by distance sensors arranged on the distributor boom; and
- wherein in the second operating mode, actuating signals are generated for the actuating device on the basis of a rotation of at least one of the chassis or the distributor boom, in the direction of travel, which has been detected by the sensor device.

13. The compensation system according to claim 1, wherein:
- the data processing device is configured in a third operating mode to generate actuating signals for the actuating device; and
- wherein in the third operating mode, actuating signals are generated for the actuating device on the basis of actual distances of the distributor boom relative to a ground surface detected by distance sensors arranged on the distributor boom, and on the basis of a rotation of at least one of the chassis or the distributor boom, in the direction of travel, which has been detected by the sensor device.

14. The compensation system according to claim 13, wherein:
- the data processing device is configured in the first operating mode, the second operating mode, or the third operating mode to generate actuating signals for the actuating device; and
- wherein a change of operating mode is initiated on the basis of the system reaching one or more threshold values selected from a list comprising:
  - a maximum or minimum rotation of the chassis in the direction of travel;
  - a maximum or minimum rotation of the distributor boom in the direction of travel;
  - a minimum time in which a rotation of the chassis in the direction of travel is present;
  - a minimum time in which a rotation of the distributor boom in the direction of travel is present;
  - a distance travelled in which a rotation of the chassis in the direction of travel is present; and
  - a distance travelled in which a rotation of the distributor boom in the direction of travel is present.

15. A distribution machine for dispensing agricultural materials, comprising the compensation system of claim 1.

16. The compensation system according to claim 1, wherein the agricultural machine is selected from a group of machines comprising:
- a field sprayer;
- a fertilizer spreader; and
- a combination field sprayer and fertilizer spreader.

17. The compensation system according to claim 1, wherein rotation in the direction of travel is a rotation along an axis which runs perpendicular to a movement direction of the agricultural machine, and which is defined according to at least one of the following:
- a rotation along an axis formed by a running gear; or
- a rotation of the chassis or boom caused by an inclination, wherein the inclination is a difference in height between a front set of wheels and a back set of wheels.

18. The compensation system according to claim 1, further comprising a speed controller configured to determine, from the detected rotation, whether the actuating device can modify the vertical position of the distributor boom with a sufficient reaction speed to prevent an upcoming collision, and if the actuating device cannot react with the sufficient reaction speed, the speed controller is configured to modify the travel speed of the agricultural machine to prevent the collision.

19. A method for compensating for ground unevenness for an agricultural machine, comprising:
- mounting a distributor boom onto a chassis in a height-adjustable manner relative to the chassis, wherein the distributor boom comprises a central part and side parts which are pivotably arranged to the left and right on the central part, as well as a plurality of distribution elements for distributing materials;
- modifying a vertical position of the distributor boom relative to the chassis via an actuating device;
- detecting a rotation in a direction of travel for the agricultural machine using a sensor device, the rotation comprising at least one of:
  - a rotation of the chassis in the direction of travel; or
  - a rotation of the distributor boom in the direction of travel; and
- generating actuating signals for the actuating device using a data processing device, wherein the actuating signals change the vertical position of the distributor boom and are generated based on the detected rotation.

20. The method according to claim 19, wherein:
the rotation in the direction of travel is a rotation along an axis which runs perpendicular to a movement direction of the agricultural machine, and which is defined according to at least one of the following:
   a rotation along an axis formed by a running gear; or
   a rotation of the chassis or boom caused by an inclination, wherein the inclination is a difference in height between a front set of wheels and a back set of wheels;
the method also further comprising:
selecting at least one of a first, second, or third operating mode for generating actuating signals via the data processing device, wherein:
   in the first operating mode, actuating signals are generated for the actuating device based on actual distances of the distributor boom relative to a ground surface, detected by one or more distance sensors arranged on the distributor boom;
   in the second operating mode, actuating signals are generated for the actuating device based on a rotation of the chassis, distributor boom, or both the chassis and the distributor boom, in the direction of travel detected by the sensor device; and
   in the third operating mode, actuating signals are generated for the actuating device based on a combination of both the first operating mode and the second operating mode.

* * * * *